United States Patent [19]
Kidd

[11] 4,368,411
[45] Jan. 11, 1983

[54] CONTROL SYSTEM FOR ELECTRIC MOTOR

[75] Inventor: H. Keith Kidd, Christianburg, Va.

[73] Assignee: Kollmorgen Technologies Corporation, Dallas, Tex.

[21] Appl. No.: 282,797

[22] Filed: Jul. 13, 1981

[51] Int. Cl.³ .............................................. G05B 11/28
[52] U.S. Cl. ................................... 318/254; 318/599; 318/341
[58] Field of Search ............... 318/685, 599, 254, 696, 318/341

[56] References Cited

U.S. PATENT DOCUMENTS

| | | | |
|---|---|---|---|
| 4,042,868 | 8/1977 | Rhodes | 318/685 X |
| 4,127,800 | 11/1978 | Long et al. | 318/685 |
| 4,193,021 | 3/1980 | Gale | 318/685 X |
| 4,236,106 | 11/1980 | Davis et al. | 318/599 |

Primary Examiner—B. Dobeck
Attorney, Agent, or Firm—Morgan, Finnegan, Pine, Foley & Lee

[57] ABSTRACT

A four quadrant control system for a brushless D.C. motor wherein the windings are energized via a drive switching circuit in a bridge configuration and the switching circuit is in turn controlled by a read-only memory. Pulse-width modulation control signals and position signals are supplied to the read-only memory as addresses together with other control signals. The system operates in a regenerative mode when changing direction and automatically makes a smooth transition into a motoring mode when the back EMF of the motor is no longer large enough to satisfy the requirements of the current loop.

15 Claims, 7 Drawing Figures

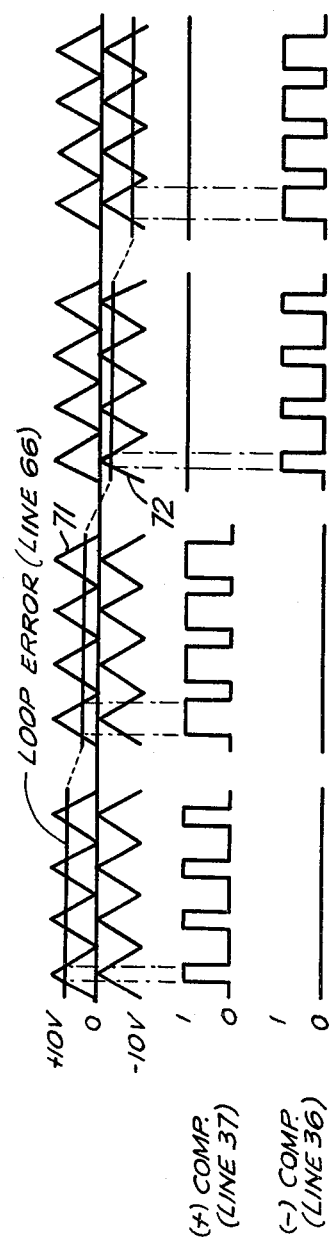
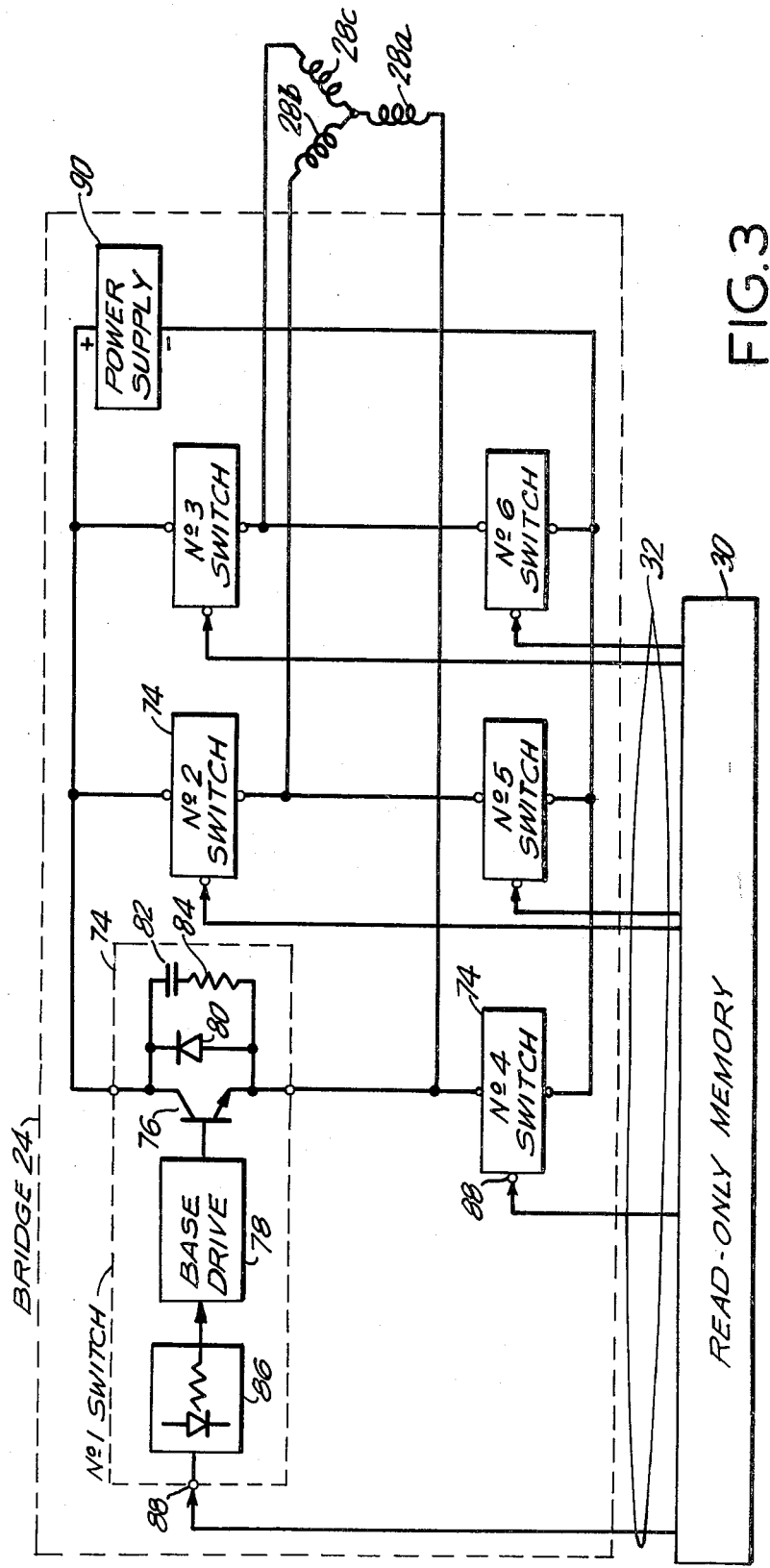

REGENERATIVE MODE

MOTORING MODE

REGENERATIVE MODE

MOTORING MODE

CONTROL SYSTEM FOR ELECTRIC MOTOR

BACKGROUND OF THE INVENTION

This invention relates to electronic control systems for electric motors and, more particularly to a servo system for a self-synchronous brushless motor.

DC brushless motors are often used in servo control systems in a wide variety of applications. Typically, brushless motors are constructed with stationary windings and a rotary permanent magnet field. The windings are commutated by solid state switches controlled in response to signals from rotor position sensors. Since the brushes and commutator of the normal DC motor are eliminated, and since commutation is controlled by solid state switches, the brushless motors are well suited for electronic servo system control.

In such a servo system, for example a torque control system, it is desirable to maintain a linear relationship for both positive and negative values of servo loop error under conditions of both positive and negative values of the command signal. The foregoing conditions represent four separate states, sometimes referred to as four-quadrant control. The positive and negative command signals correspond to desired clockwise and counter-clockwise torque during either clockwise or counter-clockwise rotation of the motor. Two of these states correspond to normal motoring modes wherein both the command signals and the error signals have the same sense, either positive or negative. In the motoring modes the motor is driven from the power source. The other two states correspond to regenerative modes wherein the command signal and the error signal have an opposite sense, one being positive while the other is negative. In the regenerative mode, the internally generated motor current is utilized to produce the desired torque.

An object of this invention is to provide a four-quadrant control system for a brushless motor which is capable of making a smooth automatic transition from one quadrant to another while maintaining a linear control relationship.

Another object is to provide a servo system for a brushless motor capable of achieving efficient control through relatively simple reliable control electronics.

SUMMARY OF THE INVENTION

In a preferred embodiment according to the invention a solid state bridge circuit is used to control current flow through the windings of a brushless DC motor. Typically, the windings can be arranged in a wye configuration and controlled by a six transistor switching bridge. In such an arrangement, when a set of windings is powered from the source, current flows through a transistor pair, one transistor of the pair connecting a selected winding to the positive source terminal and the other transistor of the pair connecting another selected winding to the negative source terminal. In the preferred embodiment the switches in the bridge are controlled by the data outputs of a read-only memory (ROM).

The servo loop error is generated by comparing the command signal to an actual motor condition. Thus, if the command signal represents desired motor torque, the command signal can be compared to current flow through the motor windings to obtain the error signal. Two comparators compare the error signal with triangular waveforms, one triangular wave having a positive sense and the other having a negative sense. Depending on the polarity of the error signal, one comparator produces an on-off pulse-width modulated signal while the other produces a steady state signal.

The ROM receives, as addresses, the comparator output signals as well as rotor position signals and other control signals. The output lines from the ROM control the bridge transistors to provide pulse-width modulated control in the proper commutation sequence.

The ROM logic uses both comparator outputs in such a manner that a smooth pulse-width modulated control transition from a regeneration mode into the motoring mode is provided. When a command is received, for example reversing torque direction, the system is thrown into a regenerative mode. In the regenerative mode one transistor of each pair is pulse-width modulated by one of the comparators while the other transistor of the pair is maintained in the "off" condition by the other comparator. The modulated transistor provides a controlled regenerative current loop for the motor generated current. As the motor speed drops and the internally generated current decreases, the system increases the duty cycle for the modulated transistor eventually reaching the full "on" condition. At this point, when the back EMF of the motor is no longer large enough to satisfy the requirements of the current loop, the error signal changes polarity and the other comparator starts pulse-width modulating the other transistor of each bridge pair thereby beginning the introduction of current from the power source. As the error signal increases, the duty cycle increases and increasingly more current is supplied from the power source.

BRIEF DESCRIPTION OF THE DRAWINGS

The foregoing aspects and other features of the invention are explained in the following description, taken in connection with the accompanying drawings wherein:

FIG. 2 is a timing diagram showing development of pulse-width modulated signals which serve as addresses for the memory of FIG. 1;

FIG. 3 is a schematic diagram, partially in block diagrammatic form, of a switching bridge circuit of FIG. 1 and its connection with the stator windings of the brushless DC motor;

DESCRIPTION OF THE PREFERRED EMBODIMENT

Figure 1:
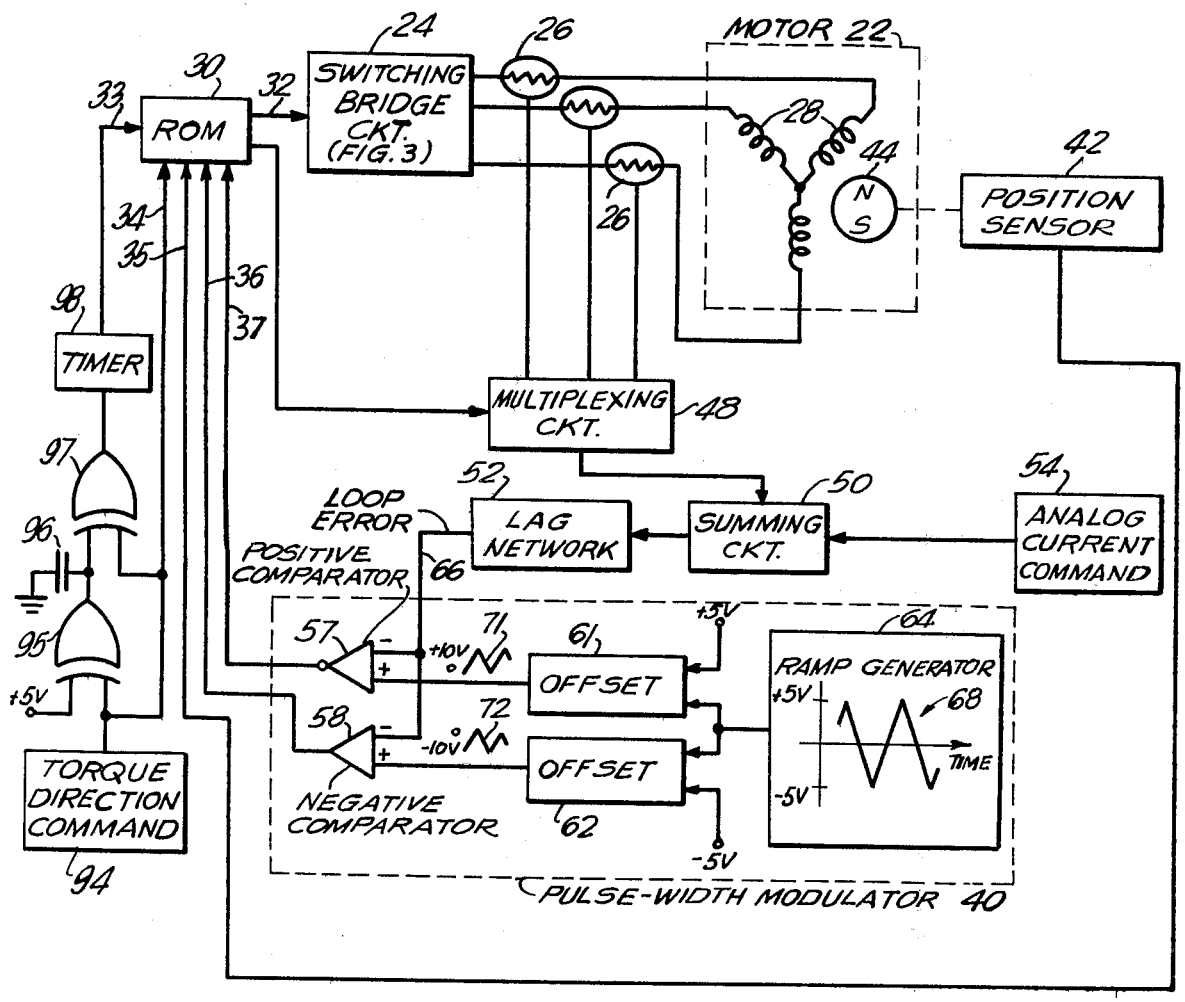
FIG. 1 is a block diagram of the control circuit of the invention connected to a brushless DC motor.

FIG. 1, illustrates the motor control circuit constructed in accordance with the invention for controlling the flow of current to a DC brushless motor 22. The control circuit includes a switching bridge 24 which is coupled by current sensors 26 to the stator windings 28 of the motor. The control circuit further includes a memory 30, such as a read-only memory (ROM), for providing control signals for operating the switching bridge. The address for memory 30 is prowided via lines 33-37 obtained from a pulse-width modulator 40, from a position sensor 42 which senses the relative position between stator winding 28 and a permanent magnet rotor 44 and from a torque direction command 94.

A multiplexing circuit 48, a summing circuit 50, and lag network 52, operate to compare the motor current through current sensors 26 with an analog current command signal 54 to provide a loop error signal on line 66. The pulse-width modulator 40 includes two comparators 57-58, two offset circuits 61-62 which may include operational amplifiers, and a ramp generator 64.

With reference to FIGS. 1 and 2, modulator 40 provides pulse-width modulated signals on lines 36-37 with a duty factor dependent on the amplitude on the loop error signal on line 66. Ramp generator 64 provides a periodic triangular waveform, as depicted in a graph 68 within the block representing generator 64, having a sequence of ramps of positive and negative slopes extending between equal magnitudes of positive and negative voltage, +5 V, and −5 V. The ramp voltage signal of generator 64 is applied to both of the offset circuits 61-62. Offset circuit 61 sums a constant voltage +5 V with the ramp voltage signal to thereby offset the ramp voltage signal in the positive sense. The output signal of offset circuit 61 extends from a value of zero volts to a voltage of +10 V. The output voltage waveform of offset circuit 61 is depicted by graph 71. Offset circuit 62 is constructed and functions similarly for summing a voltage −5 V with the ramp voltage of generator 64 to provide a ramp waveform which is offset so as to extend from a voltage of −10 V to a value of zero as depicted in graph 72. Thereby, two waveforms appear simultaneously with the same forms, as shown in the graphs 71-72, but offset from each other about the value of zero volts.

The loop error signal on line 66 is applied to the negative input terminals of both comparators 57-58. The ramp signals of offset circuits 61-62 are applied to the positive input terminals, respectively, of comparators 57-58 to produce pulse-width modulated signals on lines 37 and 36, respectively, as shown in the second and third graphs in the timing diagram of FIG. 2.

When the error signal on line 66 is positive, as shown on the left side of FIG. 2, a pulse-width modulated signal appears on line 37 with the signal amplitude extending between two voltage levels representing a logic 0 and a logic 1. The corresponding signal on line 36 has a constant logic 0 value.

When the error signal on line 66 assumes a negative value, a pulse-width modulated signal appears on line 36 while a constant value, corresponding to a logic 1, appears on line 37 as shown on the right hand side of FIG. 2.

For large values of positive error signals, the duty cycle of the logic 0 modulation on line 37 is greater than 50 percent; for reduced values of positive error signals, the logic 0 duty cycle is less than 50 percent. Two such positive error values are shown on the left side of FIG. 2. For large values of negative error signals, the duty cycle of the logic 1 modulation on line 36 is greater than 50 percent; for reduced values of negative error signals, the logic 1 duty cycle is less than 50 percent. Two such negative error values are shown on the right side of FIG. 1.

The manner in which these logic signals on lines 36 and 37 are used to control switching bridge 24 via ROM 30 will be discussed hereinafter in connection with FIGS. 4 and 5.

The repetition frequency of the ramp signal of generator 64 is equal to the repetition frequencies of the signals on the lines 36-37, and has at least twice the value of the reciprocal of the response time of a winding 28 to insure that the inductance and resistance of a winding 28 can act as a filter for smoothing pulsations in the winding current. A repetition rate of 5 KHZ (a period of 200 micro seconds) will produce satisfactory operation for most motors.

FIG. 3 illustrates switching bridge circuit 24 in greater detail including six power transistors. Each switching unit 74 includes a light emitting diode optically coupled to a base drive circuit 78 which in turn is connected to the base of an NPN type power transistor 76. A reverse polarity diode 80 is connected across the emitter-collector junction in parallel with the series combination of a resistor 84 and a capacitor 82.

A logic 1 signal from memory 30 to a light emitting diode 86 activates the diode to produce light in a sealed unit so that the photo responsive unit in the corresponding base drive 78 renders transistor 76 conductive.

In three of the switching units, designated #1, #2 and #3, the collectors of the power transistors are connected to positive terminal of a DC power source 90 whereas the emitters thereof are connected, respectively, to the three rotor windings 28a, 28b and 28c. The other power transistors, designated #4, #5 and #6 each have their emitters connected to the negative terminal of power source 90 and their collector connected, respectively to windings 28a, 28b and 28c. The stator windings 28 of the motor are connected in a wye configuration.

When the motor is energized from the power source, the transistor switches of the switching bridge operate in pairs to provide a current path through a selected winding pair in a selected direction. For example, if the transistors in switches #1 and #5 are both conductive, this pair permits current flow through windings 28a and 28b in one direction. If switch pair #2 and #4 is conductive, then current flows through windings 28b and 28a in the opposite direction.

The sequences in which the successive switch pairs of bridge 24 are rendered conductive to commutate windings 28 in response to indications from the position sensors 42 is set forth in Tables 1A and 1B for clockwise and counterclockwise rotations, respectively. The position sensor can be fabricated of optical devices or Hall devices. In the case of a three-phase wye, stator winding there would preferably be 3 position sensors A, B and C activated in the sequence A, A-B, B, B-C, C, C-A.

TABLE 1 A

| CLOCKWISE ROTATION | | | |
|---|---|---|---|
| Vector | Sensor | Switch Pair | Winding Pair |
| 1 | A | #1-#5 | 28a-b |
| 2 | A-B | #1-#6 | 28a-c |
| 3 | B | #2-#6 | 28b-c |
| 4 | B-C | #2-#4 | 28b-a |
| 5 | C | #3-#4 | 28c-a |
| 0 | C-A | #3-#5 | 28c-b |

TABLE 1 B

| | COUNTERCLOCKWISE ROTATION | | |
|---|---|---|---|
| Vector | Sensor | Switch Pair | Winding Pair |
| 0 | C-A | #2-#6 | 28b-c |
| 5 | C | #1-#6 | 28a-c |
| 4 | B-C | #1-#5 | 28a-b |
| 3 | B | #3-#5 | 28c-b |
| 2 | A-B | #3-#4 | 28c-a |
| 1 | A | #2-#4 | 28b-a |

Figure 4A:
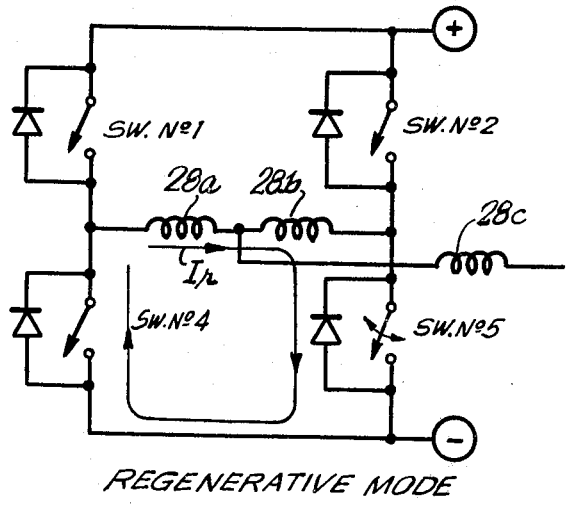
FIGS. 4A and 4B are schematic diagrams, partially simplified, showing a portion of the bridge circuit of FIG. 3 to demonstrate the operation of switching elements respectively, during the regenerative mode and motoring mode for one motor direction.
Figure 4B:
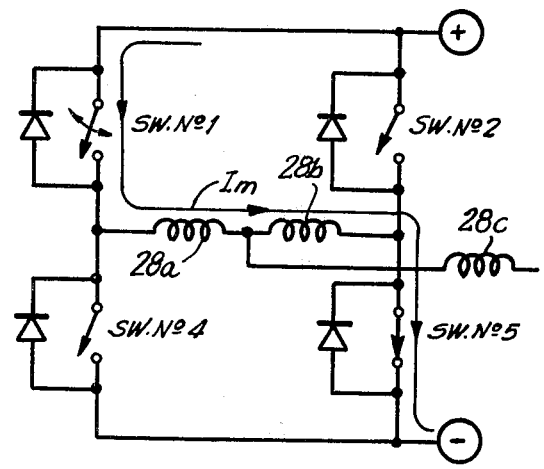

FIGS. 4A and 4B are simplified schematic diagrams showing the basic circuit configuration of a switch pair (SW#1 and SW#5) controlling current through windings 28a and 28b for one direction of motor rotation.

In the regenerative mode (FIG. 4A), as would occur upon reversal of a torque command, the motor windings generate current which can be used to develop the desired torque. A closed loop circuit for the regenerative current $I_r$ is provided by closing SW#5 so that the current flows from windings 28a-b, through SW#5, the reverse diode bypassing SW#4 and back to the windings. The current flow is controlled by pulse-width modulating SW#5 in accordance with the torque command. The remaining switches (SW#1, SW#2 and SW#4) are open in this mode.

In the motoring mode for the same motor direction (FIG. 4B), SW#5 is closed and SW#1 is pulse-width modulated. Switches SW#2 and SW#4 remain open. In this mode a drive current $I_m$m flows from the power source through SW#1, windings 28a-b, SW#5 and then back to the source.

Thus, for this particular rotor position and motor direction, SW#5 is pulse-width modulated with SW#1 open for the regenerative mode whereas SW#1 is pulse-width modulated with SW#5 closed for the motoring mode. These switches operate as a bridge pair to control current flow through windings 28a-b.

If a positive error signal is designated to correspond to the regenerative mode for the motor direction in FIG. 4A, it can be seen by referring to FIG. 2 that the logic 1 signal level on line 37 from the positive comparator can be used to turn switch SW#5 "on" to achieve the desired pulse-width modulation for this regenerative mode. Initially, when there is a large loop error, and a large current generated in the motor (far left in FIG. 2) there is a relatively low duty cycle. As the motor slows down reducing the magnitude of the internally generated current (center left in FIG. 2) the duty cycle increases. Switch SW#5 is on for increasingly longer intervals to supply the needed current for the desired torque. Eventually, when the regenerative current is no longer sufficient, a condition corresponding to a change in polarity of the loop error signal, SW#5 will have reached the full "on" condition. Note that this is the correct condition of SW#5 for the motoring mode which follows.

When the error signal becomes negative the system begins to supply current from the source with the amount of current being supplied increasing as the error becomes increasingly negative. If the logic 1 signal on line 36 from the negative comparator is used to turn on switch SW#1, the correct pulse-width modulation for the motoring mode is achieved. The duty cycle for SW#1 then increases as the error signal increases as indicated to the right in FIG. 2.

Thus, if SW#1 is controlled by the logic 1 signal on line 36 and SW#5 is controlled by the logic 1 level on line 37, a smooth transition from the regenerative mode to the motoring mode is achieved. The duty cycle of SW#5 increases to the full on condition in the regenerative mode so that in the motoring mode the current path is completed through SW#5 with SW#1 controlling the modulation and increasing the duty cycle as the loop error increases. This progression from regenerative mode to motoring mode is from left to right in FIG. 2.

Figure 5A:
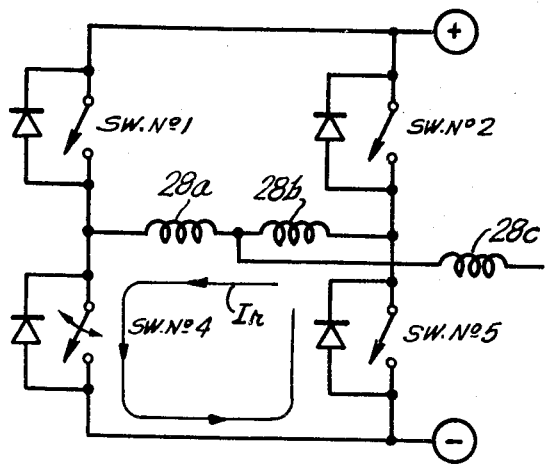
FIGS. 5A and 5B are schematic diagrams, partially simplified, of the same portion of the bridge circuit for the opposite motor direction.
Figure 5B:
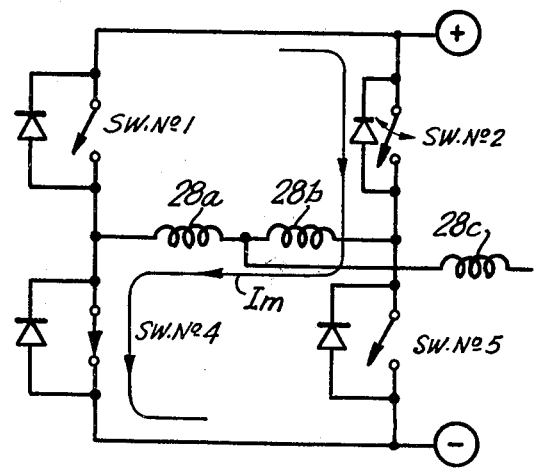

FIGS. 5A and 5B illustrate the switching circuit configuration for controlling current through the windings in the opposite direction, i.e., direction 28b-a. In this case switches SW#2 and SW#4 are the controlling switch pair in the bridge rather than SW#1 and SW#5. Switch SW#4 pulse-width modulates the regenerative current $I_r$ in the regenerative mode (FIG. 5A) whereas switch SW#2 pulse-width modulates current $I_m$ in the motoring mode (FIG. 5B).

For the opposite motor direction the loop error for the regenerative mode would be negative. Therefore the progression from regenerative mode to motoring mode in this case is from right to left in FIG. 2. The correct pulse-width modulation for SW#4 in the regenerative mode is achieved if this switch is turned on by the logic 0 signal on line 36 from the negative comparator and the correct modulation for SW#2 in the motoring mode is achieved if this switch is turned on by the logic 0 signal on line 37 from the positive comparator.

The control of the switches in bridge circuit 24 is accompanied by ROM 30 (FIG. 1). The ROM is programmed so that selected output data lines are activated to turn on selected switches in accordance with rotor position signals on lines 35, the comparator signals on lines 36-37 and the torque direction signal on line 34. The truth tables for ROM 30 are set forth in Table 2 for the "0" motor direction and in Table 3 for the "1" motor direction.

For example, if the ROM address on lines 34-37 is "011001" (hex address 19 in table 2) corresponding to, respectively, direction "0", positive comparator signal "1", negative comparator signal "1", and rotor position "001", then the six data output lines 32 would be activated showing "001100" to turn on SW#3 and SW#4 in the bridge circuit.

TABLE 2

| | | Addresses | | | | data lines 32 | | | | | |
|---|---|---|---|---|---|---|---|---|---|---|---|
| Hex Add. | Vector | line 34 Dir. | line 37 + comp | line 36 − comp | lines 35 A B C | SW #1 | SW #2 | SW #3 | SW #4 | SW #5 | SW #6 |
| 01 | 5 | 0 | 0 | 0 | 001 | 0 | 0 | 0 | 0 | 0 | 0 |
| 02 | 3 | 0 | 0 | 0 | 010 | 0 | 0 | 0 | 0 | 0 | 0 |
| 03 | 4 | 0 | 0 | 0 | 011 | 0 | 0 | 0 | 0 | 0 | 0 |
| 04 | 1 | 0 | 0 | 0 | 100 | 0 | 0 | 0 | 0 | 0 | 0 |
| 05 | 0 | 0 | 0 | 0 | 101 | 0 | 0 | 0 | 0 | 0 | 0 |
| 06 | 2 | 0 | 0 | 0 | 110 | 0 | 0 | 0 | 0 | 0 | 0 |

TABLE 2-continued

| Hex Add. | Vector | Addresses line 34 Dir. | line 37 + comp | line 36 − comp | lines 35 A B C | data lines 32 SW #1 | SW #2 | SW #3 | SW #4 | SW #5 | SW #6 |
|---|---|---|---|---|---|---|---|---|---|---|---|
| 09 | 5 | 0 | 0 | 1 | 001 | 0 | 0 | 0 | 0 | 0 | 0 |
| 0A | 3 | 0 | 0 | 1 | 010 | 0 | 0 | 0 | 0 | 0 | 0 |
| 0B | 4 | 0 | 0 | 1 | 011 | 0 | 0 | 0 | 0 | 0 | 0 |
| 0C | 1 | 0 | 0 | 1 | 100 | 0 | 0 | 0 | 0 | 0 | 0 |
| 0D | 0 | 0 | 0 | 1 | 101 | 0 | 0 | 0 | 0 | 0 | 0 |
| 0E | 2 | 0 | 0 | 1 | 110 | 0 | 0 | 0 | 0 | 0 | 0 |
| 11 | 5 | 0 | 1 | 0 | 001 | 0 | 0 | 1 | 0 | 0 | 0 |
| 12 | 3 | 0 | 1 | 0 | 010 | 0 | 1 | 0 | 0 | 0 | 0 |
| 13 | 4 | 0 | 1 | 0 | 011 | 0 | 0 | 0 | 1 | 0 | 0 |
| 14 | 1 | 0 | 1 | 0 | 100 | 1 | 0 | 0 | 0 | 0 | 0 |
| 15 | 0 | 0 | 1 | 0 | 101 | 0 | 0 | 0 | 0 | 1 | 0 |
| 16 | 2 | 0 | 1 | 0 | 110 | 0 | 0 | 0 | 0 | 0 | 1 |
| 19 | 5 | 0 | 1 | 1 | 001 | 0 | 0 | 1 | 1 | 0 | 0 |
| 1A | 3 | 0 | 1 | 1 | 010 | 0 | 1 | 0 | 0 | 0 | 1 |
| 1B | 4 | 0 | 1 | 1 | 011 | 0 | 1 | 0 | 1 | 0 | 0 |
| 1C | 1 | 0 | 1 | 1 | 100 | 1 | 0 | 0 | 0 | 1 | 0 |
| 1D | 0 | 0 | 1 | 1 | 101 | 0 | 0 | 1 | 0 | 1 | 0 |
| 1E | 2 | 0 | 1 | 1 | 110 | 1 | 0 | 0 | 0 | 0 | 1 |

TABLE 3

| Hex Add. | Vector | Addresses line 34 Dir. | line 37 + comp | line 36 − comp | lines 35 A B C | data lines 32 SW #1 | SW #2 | SW #3 | SW #4 | SW #5 | SW #6 |
|---|---|---|---|---|---|---|---|---|---|---|---|
| 21 | 5 | 1 | 0 | 0 | 001 | 1 | 0 | 0 | 0 | 0 | 1 |
| 22 | 3 | 1 | 0 | 0 | 010 | 0 | 0 | 1 | 0 | 1 | 0 |
| 23 | 4 | 1 | 0 | 0 | 011 | 1 | 0 | 0 | 0 | 1 | 0 |
| 24 | 1 | 1 | 0 | 0 | 100 | 0 | 1 | 0 | 1 | 0 | 0 |
| 25 | 0 | 1 | 0 | 0 | 101 | 0 | 1 | 0 | 0 | 0 | 1 |
| 26 | 2 | 1 | 0 | 0 | 110 | 0 | 0 | 1 | 1 | 0 | 0 |
| 29 | 5 | 1 | 0 | 1 | 001 | 0 | 0 | 0 | 0 | 0 | 0 |
| 2A | 3 | 1 | 0 | 1 | 010 | 0 | 0 | 0 | 0 | 0 | 0 |
| 2B | 4 | 1 | 0 | 1 | 011 | 0 | 0 | 0 | 0 | 0 | 0 |
| 2C | 1 | 1 | 0 | 1 | 100 | 0 | 0 | 0 | 0 | 0 | 0 |
| 2D | 0 | 1 | 0 | 1 | 101 | 0 | 0 | 0 | 0 | 0 | 0 |
| 2E | 2 | 1 | 0 | 1 | 110 | 0 | 0 | 0 | 0 | 0 | 0 |
| 31 | 5 | 1 | 1 | 0 | 001 | 1 | 0 | 0 | 0 | 0 | 0 |
| 32 | 3 | 1 | 1 | 0 | 010 | 0 | 0 | 1 | 0 | 0 | 0 |
| 33 | 4 | 1 | 1 | 0 | 011 | 0 | 0 | 0 | 0 | 1 | 0 |
| 34 | 1 | 1 | 1 | 0 | 100 | 0 | 1 | 0 | 0 | 0 | 0 |
| 35 | 0 | 1 | 1 | 0 | 101 | 0 | 0 | 0 | 0 | 0 | 1 |
| 36 | 2 | 1 | 1 | 0 | 110 | 0 | 0 | 0 | 1 | 0 | 0 |
| 39 | 5 | 1 | 1 | 1 | 001 | 0 | 0 | 0 | 0 | 0 | 0 |
| 3A | 3 | 1 | 1 | 1 | 010 | 0 | 0 | 0 | 0 | 0 | 0 |
| 3B | 4 | 1 | 1 | 1 | 011 | 0 | 0 | 0 | 0 | 0 | 0 |
| 3C | 1 | 1 | 1 | 1 | 100 | 0 | 0 | 0 | 0 | 0 | 0 |
| 3D | 0 | 1 | 1 | 1 | 101 | 0 | 0 | 0 | 0 | 0 | 0 |
| 3E | 2 | 1 | 1 | 1 | 110 | 0 | 0 | 0 | 0 | 0 | 0 |

The data outputs of ROM 30 are also used to control multiplexing circuit 48 so that selected ones of the current sensors 26 are connected to summing circuit 50 in accordance with the commutation sequence.

Where there is a reversal of the torque command direction it is desirable to momentarily first turn off all bridge transistors to make sere that previously "on" transistors are completely turned off. Otherwise, it would be possible for two transistors in the same path, e.g., switch units #1 and #4, to be conductive simultaneously and short the power source. This momentary shutdown of the bridge is achieved by the components 95-98 (FIG. 1) which provide a logic signal to ROM 30 via line 33.

The torque direction command 94 is applied to one input of an exclesive-OR gate 95, one input of an exclusive-OR gate 97 and, as previously mentioned, to ROM 30 via line 34. The other input of gate 95 is connected to the +5 V source. The output of gate 95 is connected to the other input of gate 97 and a capacitor 96 is connected between the output of gate 95 and ground. The output of gate 97 is coupled to a ROM address input via time circuit 98 and line 33.

Under steady state operating conditions, the torque direction comrand is applied to one input of gate 97 whereas the opposite logic level is applied to the other input of the gate by gate 95 which functions like an inverter. If the torque direction command changes, capacitor 96 maintains the logic on one input of exclusive-OR gate 97 so that the change in the signal from torque direction command 94 applied to the other input produces an output sipnal that triggers timer 98. When activated, time 98 produces a momentary logic 1 signal.

Line 33 is connected to an additional address input not shown in tables 2 and 3. ROM 30 is programmed such that a logic 1 on line 33 causes all data outputs to be logic 0 and, hence, all transistors in switching bridge 24 are momentarily turned off.

It is to be understood that the above described embodiment of the invention is illustrative only, and that modifications thereof may occur to those skilled in the art. Accordingly, this invention is not to be regarded as limited to the embodiment disclosed herein, but is to be limited only as defined by the appended claims.

I claim:

1. A system for controlling energization of an electric motor from an electric power source, comprising;
   a switching circuit including switching devices for selectively connecting windings of the motor to the power source in accordance with the rotor position of the motor;
   an error signal generating circuit for providing an error signal according to the difference between a control command an an actual motor condition; and
   a pulse-width modulation control circuit responsive to said error signal and operatively connected to control said switching devices in said switching circuit to provide increased duty cycle pulse-width modulation control of said switching devices as said error signal approaches zero when operating the motor in a regenerative mode, and
   to provide decreased duty cycle pulse-width modulation control of said switching devices as said error signal approaches zero when operating the motor in a motoring mode.

2. The system according to claim 1 wherein said switching circuit is a transistor bridge circuit and said switching devices are transistors operating so that each current path from the source and through selected windings of the motor passes through a pair of transistors.

3. The system according to claim 2 wherein
   one transistor of each pair is nonconductive and the other transistor of each pair is pulse-width modulated when operating in a regenerative mode, and
   said other transistor in each pair is conductive and said one transistor in each pair is pulse-width modulated when operating in a motoring mode.

4. The system according to claim 1 further including a preprogrammed memory device with data output connected to control the states of said switching devices, said memory device being connected to receive pulse-width control signals from said pulse-width modulation control circuit and rotor position signal from the motor as address inputs.

5. The system according to claim 1 wherein said control command represents the desired motor torque and said error signal is the difference between said command and the motor winding current.

6. A system for controlling energization of an electric motor from an electric power source, comprising:
   an error signal generating circuit for providing an error signal proportional to the difference between a control command and an actual motor condition;
   a positive sawtooth signal generator and a negative sawtooth signal generator;
   a pair of comparators each responsive to said error signal and operative to provide a pulse-width modulated control signal,
   one of said comparators being operatively connected to compare said error signal with the signal from said positive sawtooth signal generator,
   the other of said comparators being operatively connected to compare said error signal with the signal from said negative sawtooth signal generator; a solid state switching circuit for selectively connecting windings of the motor to the power source wherein, for each current path from the source through the windings current flows through a pair of switching devices;
   said switching devices being so connected to said comparators that
      for one polarity of said error signal one of said switching devices of each pair is "off" and the other switching device of the pair is pulse-width modulated with an increased duty cycle as said error signal approaches zero to control regenerative current through the motor windings, and
      for the other polarity of said error signal at least one of said switching device of each pair is pulse-width modulated with a decreased duty cycle as said error signal approaches zero to control current from the source through the motor windings.

7. The system according to claim 6 wherein one of the switching devices of each pair is "off" during control of regenerative current and the other switching device of each pair is "on" during current control from the source.

8. The system according to claim 6 wherein selected pairs of switching devices are operable in sequence in accordance with the rotor position of the motor to provide pulse-width modulated energization to selected motor windings.

9. The system according to claim 6 further comprising a preprogrammed memory device having data outputs connected to control said switching devices, said memory device being connected to receive said pulse-width modulated control signals as input addresses.

10. The system according to claim 9 wherein said memory device further receives address input signals in accordance with the rotor position of the motor.

11. A motor control system for controlling energization from a D.C. power source comprising:
   a brushless D.C. motor including
      stator windings
      a permanent magnet rotating field and
      a position sensor for detecting the relative orientation between the stator and rotor of the motor;
   a plurality of solid state switching devices connected to control energization of selected ones of said stator windings from the power source;
   a memory device having data output lines connected to control the states of said switching devices to commutate said windings and control the energization level thereof;
   a pulse-width modulator for producing a pulse-width signal for controlling energization of said motor;
   said memory device being connected to receive signals from said position sensor and said pulse-width modulator to control said switching devices to provide commutated energization of said motor at a level indicated by said pulse-width signal.

12. The system according to claim 11 further comprising a direction command applied to said memory device and wherein said memory device controls said switching devices for commutation in the direction according to said direction command.

13. The system according to claim 12 further comprising circuit means responsive to said direction command and operative to detect a change of direction, said circuit means being operatively connected to said memory device to momentarily render all said switching devices non-conductive upon sensing a change of direction.

14. The system according to claim 11 further including circuit means for producing an error signal by comparing an actual motor condition with a control command and wherein said pulse-width modulator is responsive to said error signal and produces said pulse-width signal with a duty cycle in accordance with the magnitude of said error signal.

15. The system according to claim 14 wherein said switching devices operate in pairs to provide current paths from the source to selected stator windings and wherein said memory device provides increased duty cycle pulse-width control of one switching device of each such pair as said error signal approaches zero when said motor is operating in a regenerative mode and provides decreased duty cycle pulse-width control of the other switching device of each such pair as said error signal approaches zero when said motor is operating in a motoring mode.

* * * * *